United States Patent [19]
Clark et al.

[11] Patent Number: 6,075,773
[45] Date of Patent: Jun. 13, 2000

[54] MULTI-USER LAN PACKET GENERATOR

[75] Inventors: Paul Henry Clark, Westborough; Quint Allen Paul, Westminster; David Robert Sosnoski, Sterling, all of Mass.

[73] Assignee: 3Com Corporation, Santa Clara, Calif.

[21] Appl. No.: 09/042,878

[22] Filed: Mar. 17, 1998

[51] Int. Cl.[7] .................................................. G01R 31/08
[52] U.S. Cl. .......................................... 370/241; 714/724
[58] Field of Search .................................... 370/241, 243, 370/244, 245, 246, 250, 242, 249, 252, 455; 714/712, 724, 725, 734, 742

[56] References Cited

U.S. PATENT DOCUMENTS

| | | | |
|---|---|---|---|
| 5,477,544 | 12/1995 | Botelno | 371/20.1 |
| 5,724,510 | 3/1998 | Arndt et al. | 395/200.5 |
| 5,907,544 | 4/1999 | Rypinski | 370/337 |
| 5,910,977 | 6/1999 | Torregrossa | 379/29 |

*Primary Examiner*—Douglas W. Olms
*Assistant Examiner*—Ken Vanderpuye
*Attorney, Agent, or Firm*—McGlew and Tuttle, P.C.

[57] ABSTRACT

A packet generating Ethernet testing device is provided with a microprocessor for generating packets. A packet memory is provided which stores the generated Ethernet packets. A packet forwarding device is connected to the packet memory and to the microprocessor. A MAC bus is connected to the packet forwarding device for forwarding packets to the bus and receiving packets from the bus. A plurality of media access controllers (MACs) are connected to the MAC bus for controlling an output of Ethernet packets from the packet memory. A physical layer connection is provided connected to each of the media access controllers. A media interface is connected to the physical layer. The media interface is connected to a port of a device to be tested for injecting Ethernet packets into the device to be tested. The packet generating Ethernet testing device preferably also includes another MAC bus and another plurality of media access controllers connected to the another MAC bus. A physical layer connection is provided for each of the another plurality of media access controllers. A media interface is connected to the physical layer of the another plurality of media access controllers.

18 Claims, 8 Drawing Sheets

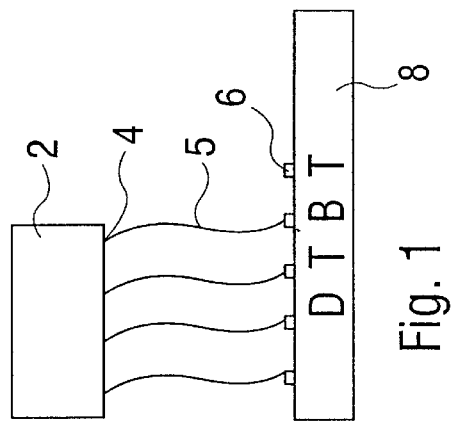
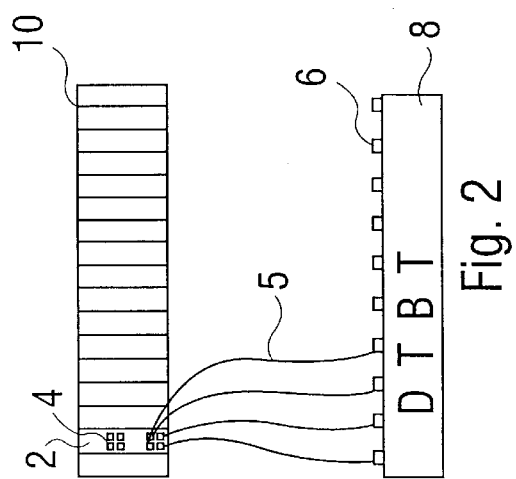
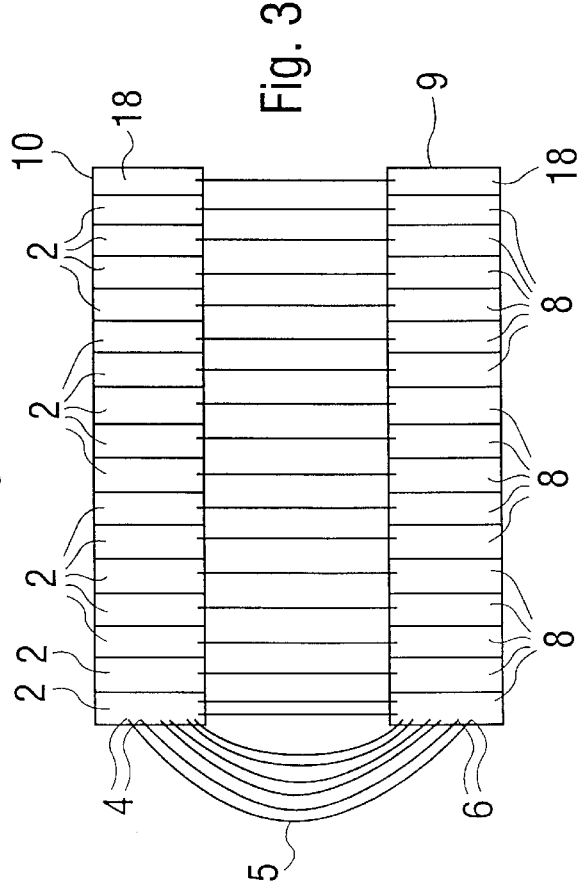

MULTI-USER LAN PACKET GENERATOR

FIELD OF THE INVENTION

The invention relates generally to local area networks (LANs) and it is more particularly directed to an Ethernet test system which generates Ethernet packets for testing one or more of Ethernet hubs (including repeaters, bridges, etc.), individual Ethernet media distribution cards as well as Ethernet hubs having slots for receiving media distribution cards.

BACKGROUND OF THE INVENTION

It is known to provide testing devices for local area network components. For example, hubs, routers, repeaters and other local area network components are preferably tested for quality assurance purposes, prior to the components being shipped. Other devices such as media modules, which may be used with large hubs having a plurality of slots, are also preferably tested. It is especially important to test the ports such as by sending packets to the ports of the device.

A device for generating packets has been used in the past for testing local area network devices. Such a packet generator is connected to a port of a local area network device and the packet generator generates one or more packets. Although such a packet generator provides a useful test function, the connection to a single port does not provide a realistic test. The test does not determine if the packets reach the destination port properly and such a packet generator connectable to a single port does not provide situations which are closely similar to the situations encountered during actual use.

SUMMARY AND OBJECTS OF THE INVENTION

It is an object of the invention to provide a testing device for testing local area network devices, which can provide a fast multi-user test system which generates packets for a high port count Ethernet product or similar local area network product wherein the testing can be conducted in a relatively short amount of time.

According to the invention, a packet generating Ethernet testing device is provided, comprising a microprocessor for generating packets. A packet memory is provided which stores the generated Ethernet packets. A packet forwarding device is connected to the packet memory and to the microprocessor. A MAC bus is connected to the packet forwarding device for forwarding packets to the bus and receiving packets from the bus. A plurality of media access controllers (MACs) are connected to the MAC bus for controlling an output of Ethernet packets from the packet memory. A physical layer connection is provided connected to each of the media access controllers. A media interface is connected to the physical layer. The media interface is connected to a port of a device to be tested for injecting Ethernet packets into the device to be tested.

The packet generating Ethernet testing device preferably also includes another MAC bus and another plurality of media access controllers connected to the another MAC bus. A physical layer connection is provided for each of the another plurality of media access controllers. A media interface is connected to the physical layer of the another plurality of media access controllers. A first additional packet forwarding device is connected to the MAC bus and a second additional packet forwarding device is connected to the another MAC bus. A main bus is connected to the packet forwarding device, to the first additional packet forwarding device and to the second additional packet forwarding device, whereby the Ethernet packets from the high speed memory are forwarded to the main bus by the packet forwarding device and the first additional packet forwarding device and the second additional packet forwarding device selectively forward packets to the MAC bus and the another MAC bus respectively.

The design of the invention provides a high port count fully controllable packet generator. The device relies on a microprocessor for generating packets which are stored in memory wherein the microprocessor controls the high speed packet memory. The device preferably has a multi-bus subsystem whereby Ethernet packets are transferred to attached MAC (media access controller) chips and then transmitted on the physical media of the device to be tested. This allows the injection of external Ethernet packets into a network product to ensure that the product operates correctly. The invention provides a highly cost effective way to verify and test network products.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view showing the packet generator device according to the invention in a simple form coupled to a device to be tested;

FIG. 2 is a schematic view showing the packet generator of the invention disposed in a slot of a multislotted hub (concentrator) and showing the packet generator connected via lines to ports of a device to be tested;

FIG. 3 is a schematic view showing a packet generator module along with peer packet generator modules together disposed in a hub wherein the media interface of the various packet generators are connected to the various ports of a plurality of media modules to be tested;

DESCRIPTION OF THE PREFERRED EMBODIMENTS

Figure 4:
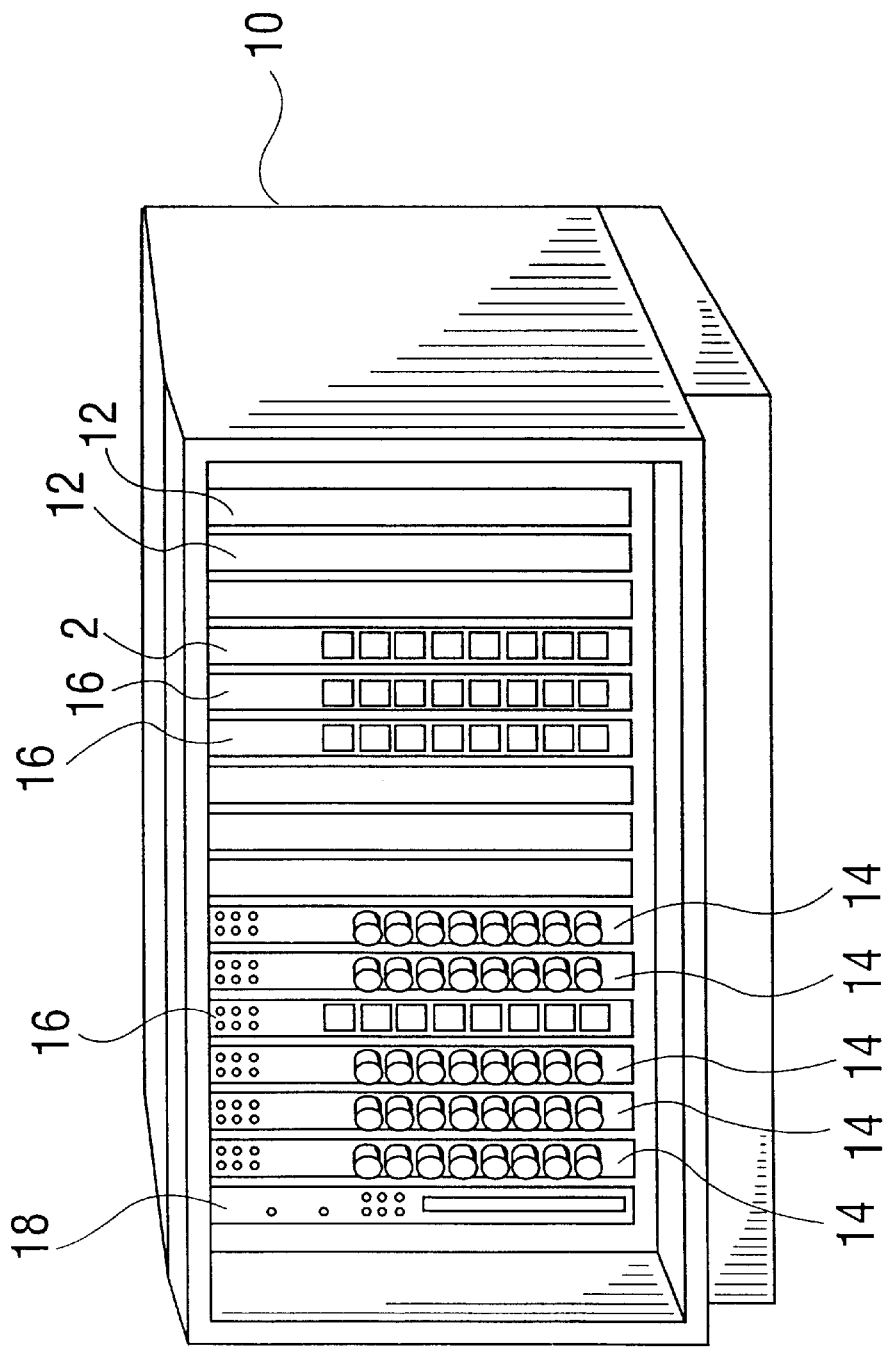
FIG. 4 is a perspective view of a multislotted hub with connected media modules and a connected packet generator.

Referring to the drawings in particular, the invention comprises a high port count packet generator designated 2 in FIG. 1. The packet generator 2 has what is referred to as a front end with a media interface having a plurality of connection ports 4. The connection ports 4 are connected by links 5 to a device to be tested (DTBT) 8. The device to be tested 8 has a plurality of ports 6. The links 5 connect the ports of the packet generator 2 with the ports 6 of the DTBT 8.

FIG. 1 shows the most basic arrangement of the device 2 in that it is provided as a single unit. The unit may for example include a small housing with a power supply. The ports 4 of the packet generating device 2 are preferably for more than one media type. For example, according to a preferred design of the invention, the packet generator 2 includes four connection ports 4, for twisted pair (for example for 10 base T or 100 base T—10 megabits for second/100 megabits per second Ethernet). Additionally, four outlet/ports 4 are provided for fiber media (100 Mb/s Ethernet). Other media connection interfaces (input/output ports 4) may be provided (for example for coaxial media). Other aspects of the front end are described further below.

The DTBT 8 may have ports for one of the media types or both (as is generally known). It may be a media distribution card, a repeater hub, a concentrator or any of a variety or combination of devices as further discussed below.

FIG. 2 is a schematic view showing the packet generator device 2 housed within a hub housing 10. The hub housing 10 may be a typical network concentrator housing having a plurality of slots for connection of media distribution devices, bridges, routers, etc. In FIG. 2, a single packet generator 2 is installed in the slot of the hub 10. The hub 10 provides the necessary power (and also potentially control functions) for the packet generator 2. In a manner similar to that shown in FIG. 1, the packet generator 2 (housed in and powered by the hub 10) is connected by a links 5 to port 6 of a DTBT 8.

FIG. 3 shows schematically a hub 10 which houses a plurality of packet generating devices 2. In FIG. 3, the hub 10 is similar for example to a 17 slot hub disclosed in U.S. Pat. No. 5,530,842 (U.S. Pat. No. 5,530,842 is hereby incorporated by reference). Of the 17 slots of the hub 10, 16 slots are provided with packet generating devices 2. The 17th slot is provided with a control module 18 (as discussed further below). In this arrangement, the various modules 2 which are mounted in the hub 10 are referred to as peers or peer modules 2. According to the invention, the various modules 2 may act together to test the plurality of DTBTs 8. For example, a similar hub 9 may be provided with 16 slots, with several of the slots having media modules 8 which are to be tested (alone or in conjunction with the hub 9). The various ports 6 of each DTBT 8 may be connected to an output 4 of one of the packet generating modules 2. The hub 10 again provides the necessary power and possible control function (via controller 18 or otherwise). According to the invention, the packet generating modules 2 send packets via links 5 and port 6 to the DTBTs 8 and signals are passed back from the DTBTs 8 via links 5 to different ports, or the same ports (and even different modules 2). In this way, many packets may be generated for fully testing the media devices 8 and supporting hub 9.

FIG. 4 shows a hub 10 which may be a device to be tested or which may be the device for housing and powering one or more packet generator 2. This type of hub 10 has a plurality of slots which receive one of various modules for local area network applications. For example, a plurality of fiber modules 14 may be provided and a plurality of twisted pair modules 16 may also be provided. The ports 6 of these various modules may be connected to another hub 10 housing one or more packet generator 2 and it is also possible for ports of the media module to be connected to packet generators 2 provided in the slots 12 of the same hub housing 10. Additionally, a controller module 18 may be provided. Other modules including an additional power supply module, a LAN management module, a bridge support module, a bridge device and other devices may also be connected by the slots 12 of the hub housing 10. Such a hub housing 10 may also be used exclusively for test purposes, namely by providing one or more slots with packet generating modules 2 to test some other network device (as shown in FIG. 3).

Figure 5:
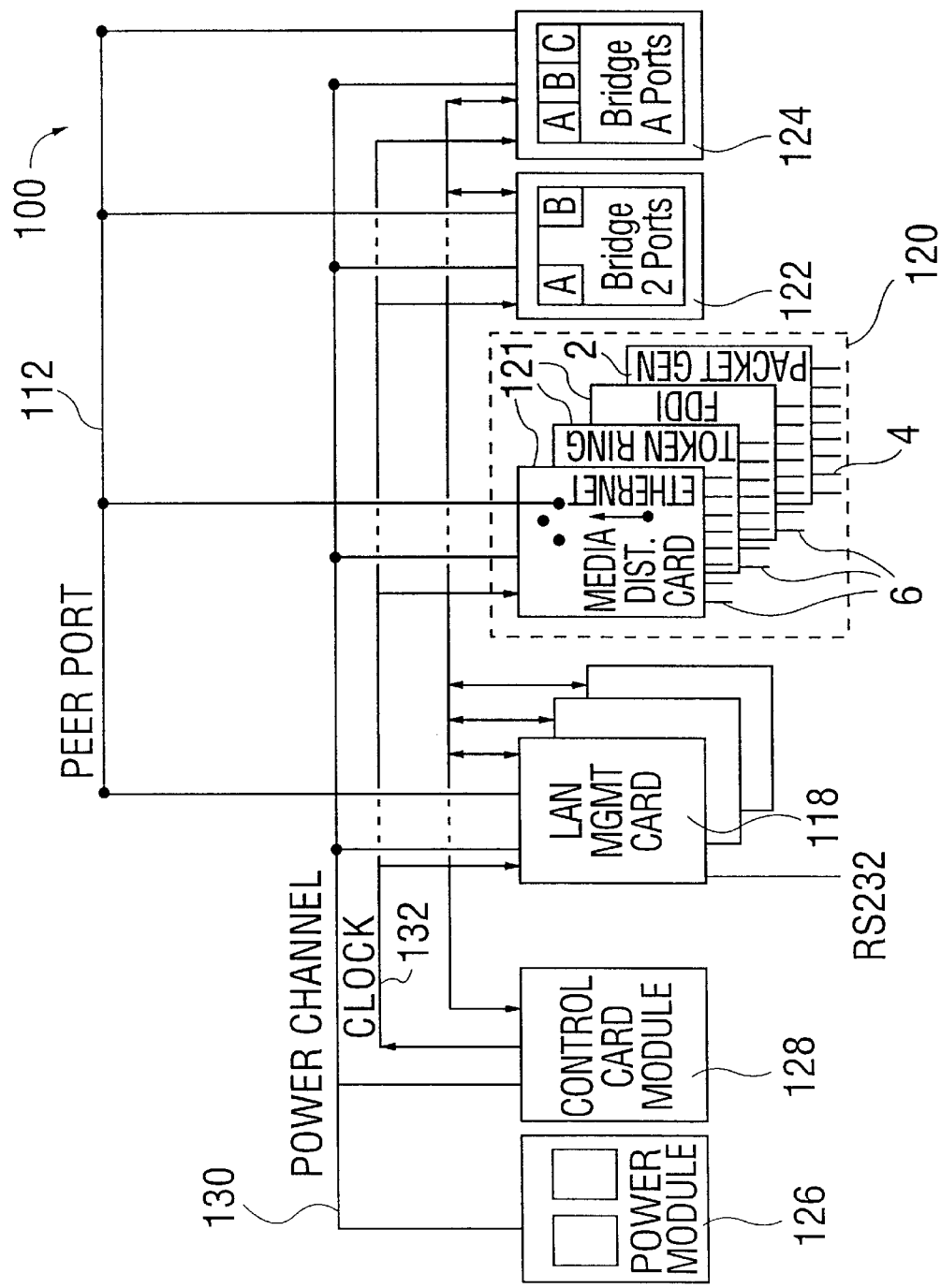
FIG. 5 is a diagram showing a hub backplane with connected media distribution cards and other connected devices.

FIG. 5 is a schematic diagram showing basic features of a hub 10. The hub 10 has a backplane generally designated 100 with the plurality of communication channels 114, 116. These communication channels are typically used to establish a local area network via connection of media distribution cards 121 in one of a plurality of slots 120. However, this same hub with backplane 100 and slots 120 may be used to connect packet generating devices 2 as described herein. Each of the connected devices, for example packet generating devices 2 or media distribution cards 121 has ports for input/output connection interface 119. Additionally, other modules or cards may be connected to the slots such as bridge modules 122, 124, LAN management card 118 and a control card module 128. Typically, at least the power module is provided internally to provide power via a power channel or power bus 130. The control module also provides a clock signal via clock bus 132. In such an arrangement, each slot 120 may be provided with a packet generating device 2 to provide a very high port count testing device. Further, as discussed below, the various packet generating devices 2 (peer modules) may be connected via a wire connection (at the front end) or via the existing channels 114, 118, to provide synchronization and control in unison of the various packet generating devices. This arrangement provides extreme flexibility and allows for extensive coordination of testing even with a very high port count.

Figure 6:
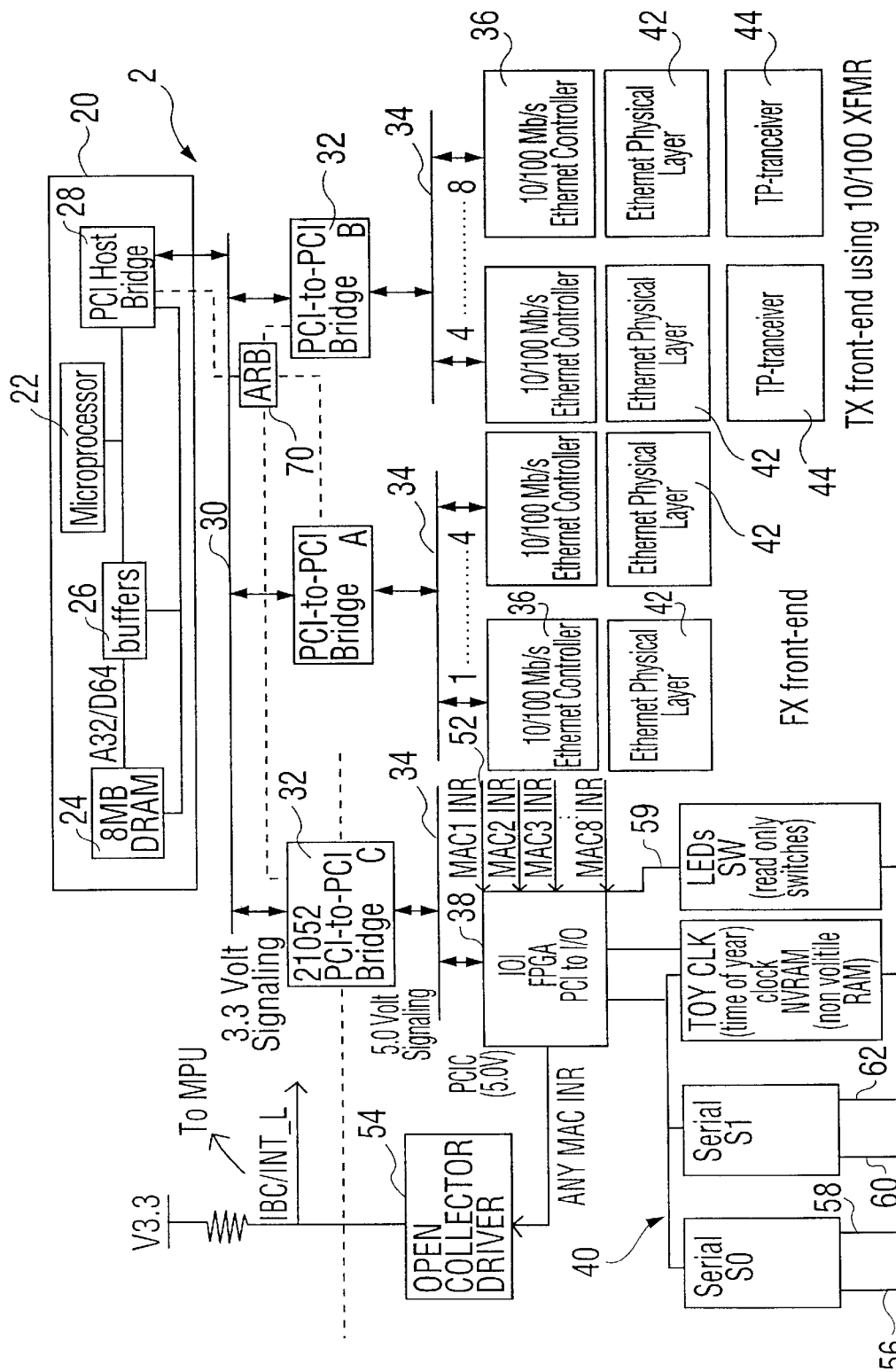
FIG. 6 is a circuit diagram showing important features of the packet generator device according to the invention.

FIG. 6 is a circuit diagram of a preferred packet generating device 2 according to the invention. The packet generating device 2 includes a main module portion 20. This is preferably provided as an individual unit (daughter card connected to a mother board) to provide common packet management, separate control and other advantages of a modular unit. The main module portion 20 includes a microprocessor 22 which fabricates packets and sends them to the attached media. A memory 24 is provided connected to the microprocessor 22. Packets generated by the microprocessor 22 are placed in memory 24, preferably in one of several queue's (see queue structure discussion below). The microprocessor 22 may be for example a 603 power PC processor and the memory 24 may be for example 8 megabytes DRAM. A buffer 26 is also provided connected to both the microprocessor and the DRAM 24. A main packet forwarding device (PCI bridge or PCI host bridge) 28 is provided connected to the microprocessor as well as buffer 26 and the memory 24. The PCI bridge 28 is connected to a main bus 30. All communications (packets generated) flow to the main bus 30 via the PCI bridge 28.

The PCI bridge 28 may be for example 3.3 volts providing a 800 Mbps/1000 Mbps full duplex link.

According to a preferred architecture of the packet generating device 2 according to the invention, a plurality of secondary packet forwarding devices (bridge PCI-to-PCI bridges) 32 are provided (as part of the motherboard). The preferred architecture provides 3 PCI-to-PCI (secondary)

bridges 32 (bridges A, B, C). Each secondary bridge 32 is in turn connected to one of three secondary buses 34. The secondary buses 34 may be a PCIA bus (5.0 v) and may be full duplex PCIA buses operating at 400 Mbps/1000 Mbps.

Bridge A is connected to a plurality of media access controllers (Ethernet controllers MACs) (also known as Ethernet controller) 36 via the first PCI bus 34. In the similar manner the PCI bridge B is connected to a plurality of MACs 36 via the second PCI bus 34. The PCI bridge 32 labeled "C" is connected to an input/output branch including field programmable gate array (FPGA) 38 with connected serial controllers 40.

Each of the MACs 36 are connected to Ethernet physical layer means 42. Several of the MACs are provided for one media type (fiber) and others are provided for another media type (twisted pair). The twisted pair front end includes twisted pair transceivers 44.

The preferred architecture of the invention provides 8 MACs wherein 4 MACs 36 are connected to each secondary bus 34 which in turn is connected to the PCI-to-PCI bridge 32 (A or B) which are in turn connected to main bus 30 and through the main bus 30 to the PCI host bridge 28 and attached microprocessor 22 and attached memory 24. Other architectures are possible, however, the multibus system provides significant advantages including different media types at the front end and other advantages to be discussed below. Further the additional bridge 32 "C" provides operational advantages as discussed immediately below.

The PCI-to-PCI bridge 32 labeled "C" in FIG. 6 is connected to the PCI secondary bus 34 labeled "C". This third bus provides a conglomeration of service and user interface features. The FPGA 38 has several MAC interrupt inputs 52. FPGA 38 is connected to open collector driver 54 which in turn is connected to the microprocessor unit 22.

Gate array 38 has as inputs 52 the interrupts from the MAC such that if an exception (exception condition—a drained output FIFO, characters in FIFO, a CRC error, framing error, parity error when doing DMA etc.) occurs the particular MAC 36 asserts an interrupt line 52. The MAC interrupts are "OR"ed together inside the gate array 38. The MAC interrupt occurrence is indicated via collector driver 54 to microprocessor 22. The microprocessor then acts to see which MAC needs service The FPGA 38 (coded in VHDL register transfer logic) provides an interface to other elements. This is particularly useful as the packet generator 2 may be connected to other packet generators (peers) for example up to 16 packet generators 2 may be provided in the hub 10 with processors working in parallel. The FPGA 38 also provides an interface (write only) to display lights at 59. Further this interface 59 provides an interface with read only mode switches SW (shown in FIG. 6) which are provided on the outside of the module 2. Additionally, an interface to a non-volatile memory date/clock is provided as well as an interface to serial UARTs with two ports. That is, four UARTs (universal asynchronous receiver transmitter).

Four serial ports 56, 58, 60 and 62 are provide according to the preferred embodiment. One port is referred to as the DBUG port 56—serial interface for an operator. This port 56 is useful for transferring data, stopping traffic and sending other signals for communicating with the programmable packet generator 2. Through this "debug" serial port, a terminal may be directly connected to the unit 2 in order to get status information, or for debugging a unit 2 outside of the enclosure 10. The "debug" port can be connected for status and debugging purposes at all times if desired. The debug port is not exclusive of the main port, and the unit 2 will look for and process commands on the debug port similarly to its processing of commands on the main port. If a command is sent on the main port, the response will be sent on the main port. If a command is entered on the debug port, any output or response information will be sent to the debug port.

Figure 8:
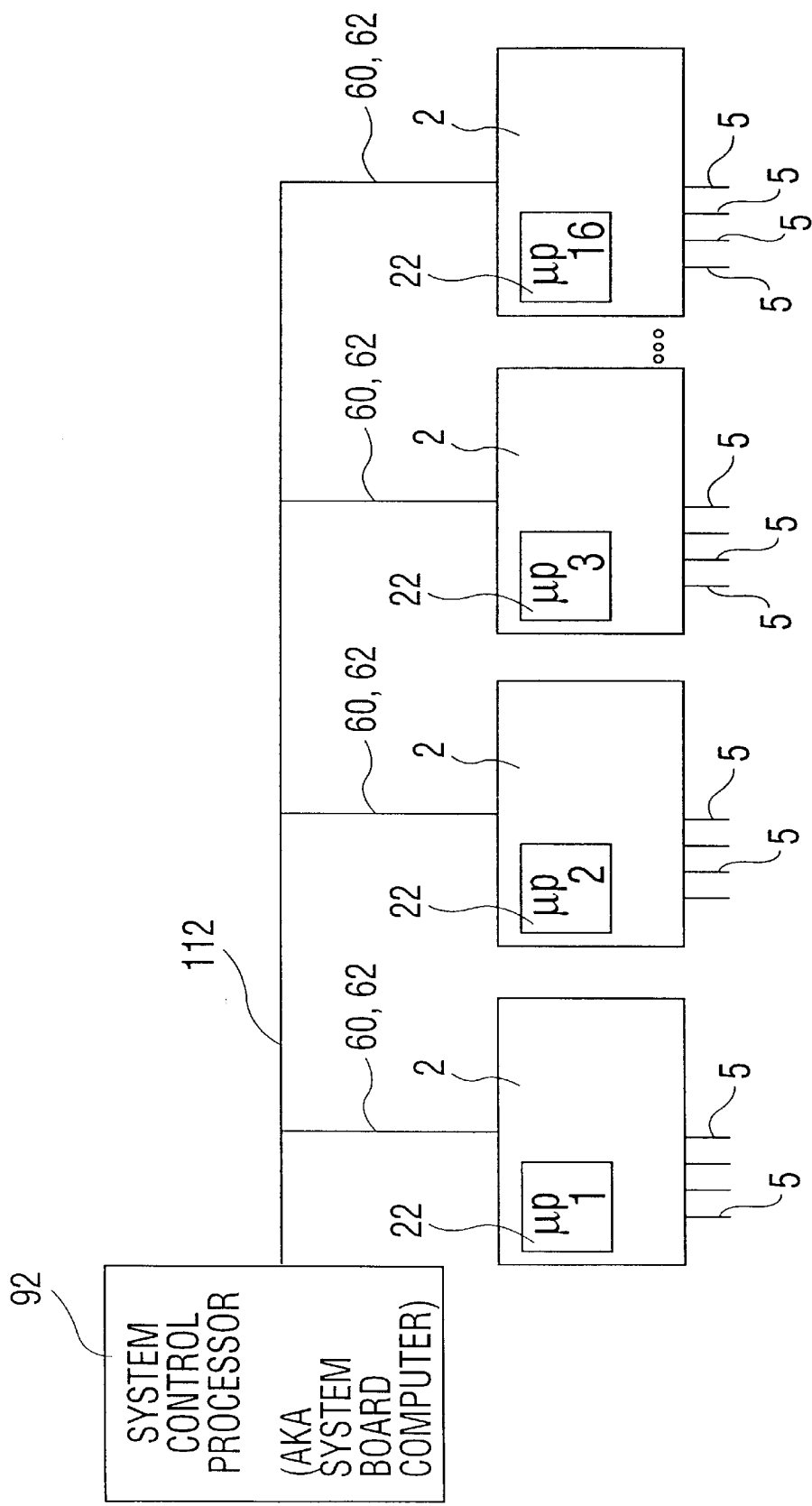
FIG. 8 is a diagram showing an interconnection of packet generating devices providing parallel simultaneous large port count testing.

Another port 58 is the SBC port (single board computer port) for connection to a system control processor 92 (see FIG. 8). The SBC port allows software (e.g. a windows application) to send commands to all boards within the enclosure 10, and it also is used for downloading new versions of operational firmware to a board. The system normally operates in a master/slave arrangement, where the is the master is the system control processor 92, and the individual unit 2 or board 2 is the slave. The slave board never initiates an action without a request from the system control processor 92, nor does it ever send information to unless requested. If a command is sent to the master board (the one it's connected to), but the command is destined for a different board, the master board will forward the command over the peer-port to the other board (exactly as if the user had typed a command on the debug port that was intended for a different board).

The system control processor 92 port does not wait for most unit 2 commands (such as tests) to complete before returning control to the system control processor 92. The unit 2 usually sends an acknowledgment of the command back to the system control processor 92 immediately, and then performs the desired action (such as a test). The system control processor 92 will then be free to poll the units periodically to get their status. This way, the system control processor 92 can find out when commands have been fully processed by the unit 2, and whether any errors occurred during the test. Functionally, the system control processor 92 will be continually polling the units 2 for status, until all actions are either complete or unable to be completed. Port 58 provides an interface for connection of the programmable packet generator 2 with a computer 92 for an automated computer process to assist in testing.

Additional ports 60 and 62 are provided which are referred to as "peer ports". These ports 60 and 62 are used for wiring one module 2 to another, either daisy chain connecting 17 modules or connecting a computer or operator 92. The peer ports 60 is a multidrop port following the RS 485 standard of electrical definition of interfaces bus protocol—terminal interface). The port 62 is preferably used for a connection into the host hub such as hub 10. Specifically, the programmable packet generator 2 is preferably plugged into a hub such as hub 10 to provide power and additionally possibly control or use of the backplane 112 for coordinating the generation of packets by a plurality of packet generators 2. The arrangement using peer ports is discussed further below with reference to FIG. 8.

As can be seen in FIG. 6, an arbiter device 70 provides a mechanism to share bandwidth for satisfying the requests of the bridges 32 (PCI-to-PCI) A, B and C as well as PCI host bridge 28. Arbiter 70 grants access to main PCI bus 30 in a round robin manner (other arbiter schemes are also possible) granting access to the bus of the bridge whereby one of the four buses initiates data transfer for a length of burst. The bursts are 32 words (not full length of a packet). Additionally, interleaved is DMA traffic, namely direct memory access request (from/to) the MACs 36.

In operation, the microprocessor 22 generates packets which are placed in memory 24. The packets may be arranged in various queue's, each queue being associated with one of the 8 MACs 36. The DMA engines (direct memory access request engine) in each MAC retrieves a packet from the packet memory 24 and transfers the packet to the ports 4 at the associated front end. Each MAC 36 is prompted via the queue structure of the memory 24. Each packet is preprocessed to have a destination MAC associated with another port on the packet generator 2 or on a connected associated peer packet generator module 2. The receiving MAC receives the packet and loads the packet into the buffer of common memory 24 of main module 20.

The processor signals the preconditions with addresses in the memory subsystem of the queue of memory 24. The memory location is pointed to by memory in the particular MAC 36 which starts going through the queue structure associated with that MAC, in memory 24 (in the common memory). Specifically, each MAC 36 has a queue structure in the common memory 24. The PCI bus 30 allows for high volume traffic as the various MACs are prompted via their associated queue structure. The bridges 28 and 32 A, B, and C present a limit as to bandwidth and filter data requests. At bus 30, the arbitration mechanism 70 allows data transfer to be initiated.

Figure 7:
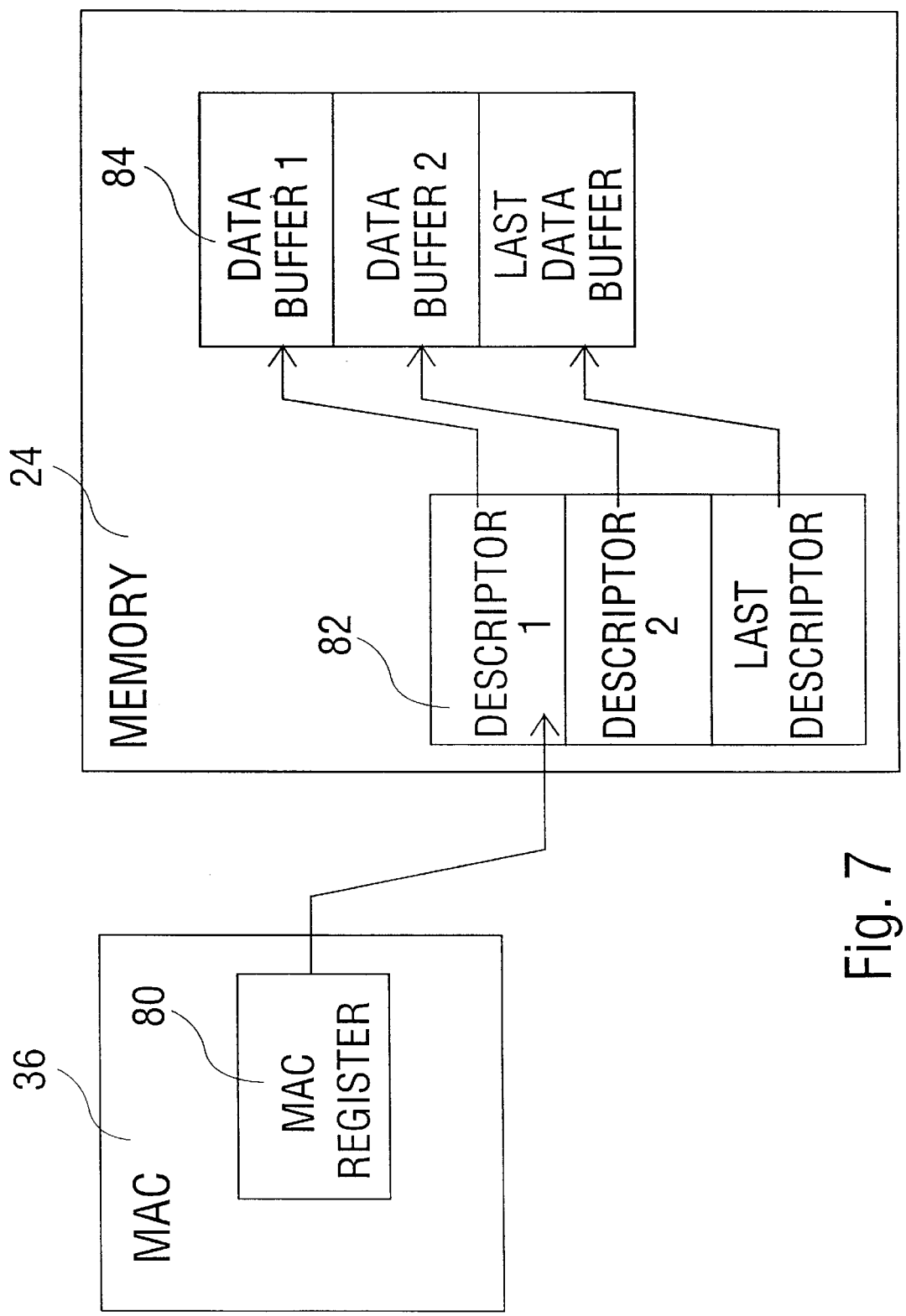
FIG. 7 is a diagram showing the queue structure according to the invention.

FIG. 7 is a diagram showing the queue structure of the invention. The microprocessor 22 loads a register 80 in MAC 36 via a MAC bus 34 with memory which points to a descriptor 82 which in turn points to a data buffer 84. The descriptors 82 and data buffers 84 are queued up as shown (from first to last).

The packet generator of the invention allows for a plurality of ports to be connected into a common resource. This provides for a parallel testing of many ports and provides significant advantages as compared to a per port testing. With many modules, a very high through put is possible.

With the packet generating system according to the invention, it is possible to create collisions and to test media distribution modules (or line cards/adapter modules). It is also possible to check for CRC (cyclical redundancy check) errors and framing errors. The system allows for the identification of truncated packets and even the generation of truncated packets. It is possible to vary the content of the packets including the header (source/destination—packet type) as well as body. For example, the body of data can be random or be a pattern and both the contents and length (64 to 1,518 bytes—Ethernet limit) or any other size is possible. The command structure allows a port to be logically connected to another port, each of which has a MAC, whereby packets can be addressed and echoed back and forth through the network.

The invention allows the packet burst count to be set wherein packets are sent a number of times, the system then waits and when it receives the burst it echoes the burst. Repeat counts are also possible (when packets reach the destination they repeat it back to the source). The invention further allows the traffic to be throttled and it is possible to manipulate the IPG (inter packet gap—time between packets).

FIG. 8 shows a diagram whereby several packet generating units 2 are connected together via a multidrop peer port 60 or 62. The peer port 60 may be bussed between the boards or units 2 through a separate serial party-line bus on the chassis backplane such as channel 112 (see FIG. 5). This bus is used for peer-to-peel communications between generators 2 so that these units 2 may communicate with each other for setup or configuration management, and to allow a single command from the system control processor 92 to affect multiple units 2. Unlike the other ports, the PEER port may operate at much higher data rates (possibly 57.6 k or higher). For simplicity, the peer port may use a master/slave protocol, where one of the units 2 will be the master, and all others will be slaves. The master will be the first unit 2 to receive either a debug command, or a system control processor 92 command. It will then identify itself to the other units 2, and they will become slaves. The master unit will send commands onto the bus (112), and get responses from the slave units 2. A method can be made available to change the master unit 2 without cycling the power to units 2.

Figure 9:
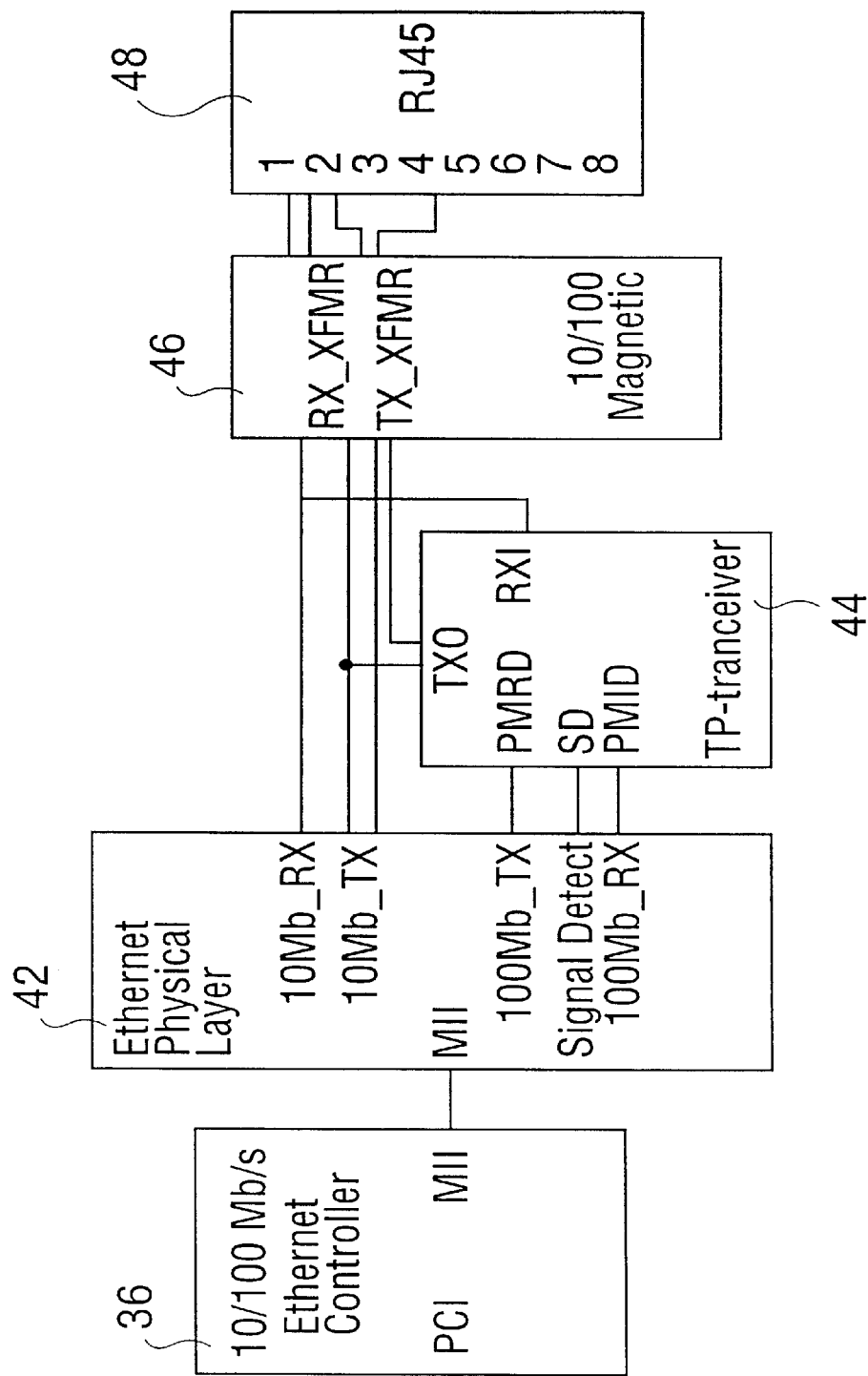
FIG. 9 is a circuit diagram showing important features of the twisted pair front end according to the invention.

FIG. 9 shows the twisted pair front end block diagram. This includes the MAC 36 (10/100 Mb/s Ethernet controller) which is connected to the physical layer means 42. The Ethernet physical layer means (media and signaling scheme) 42 is connected to the TP-transceiver 44 and also the transmitter receiver front end isolating coupler 46. Isolating coupler (a transformer) 46 is in turn connected to RJ 45 plug/socket 48.

Figure 10:
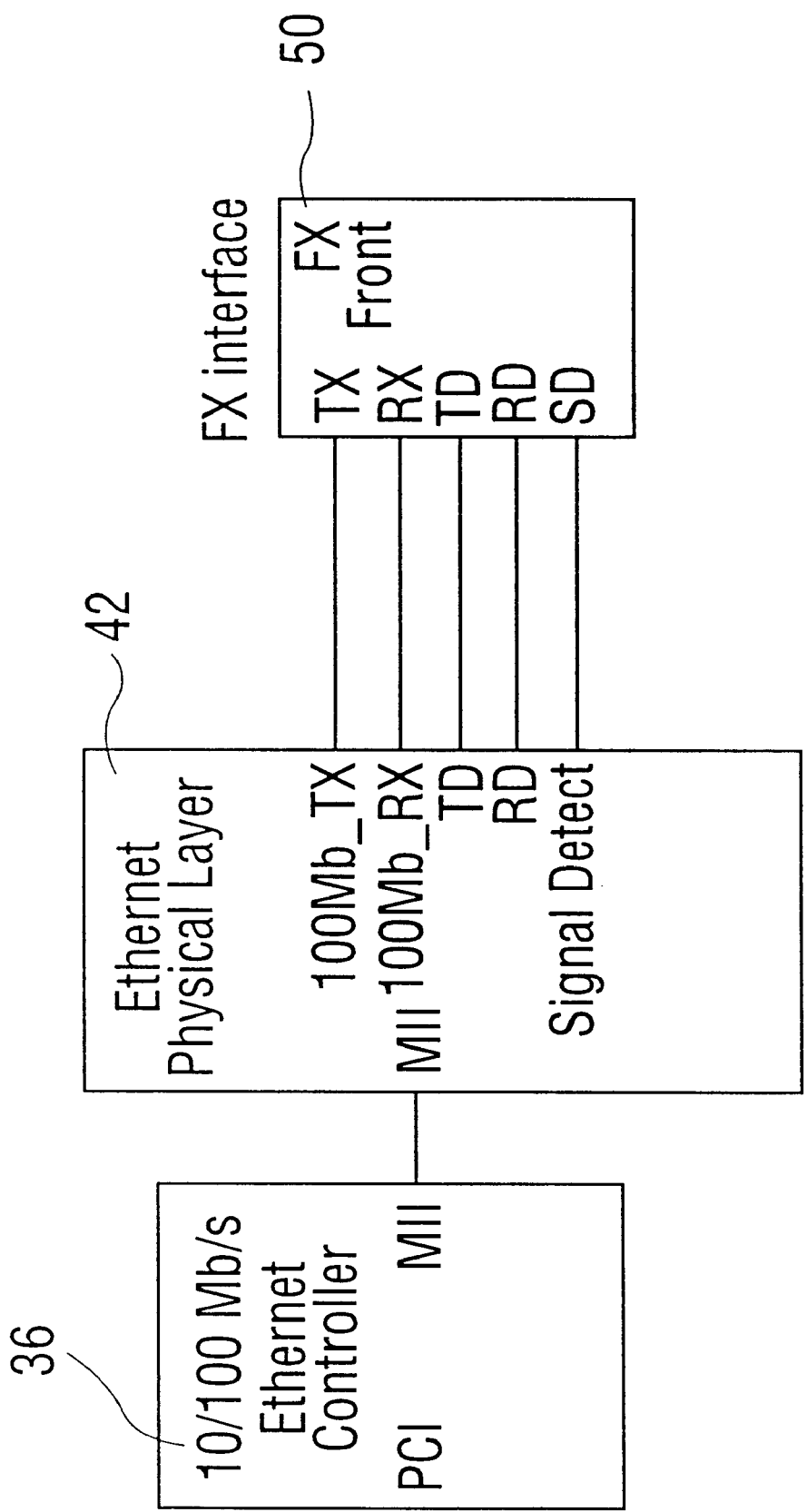
FIG. 10 is a diagram showing important features of the fiber optic front end of the packet generator according to the invention.

The fiberoptic front end is shown in FIG. 10. This includes the MAC 36 connected to the Ethernet physical layer means 42. The physical layer means 42 is in turn connected to the fiber interface 50.

While specific embodiments of the invention have been shown and described in detail to illustrate the application of the principles of the invention, it will be understood that the invention may be embodied otherwise without departing from such principles.

What is claimed is:

1. A packet generating Ethernet testing system, comprising:
   a first test packet generator unit with
      a microprocessor for generating Ethernet test packets,
      packet memory for storing Ethernet test packets, said microprocessor being connected to said packet memory,
      a media access controller connected to said packet memory and to said microprocessor, said media access controllers for controlling an output of Ethernet test packets from the packet memory, and
      a physical layer connection to said media access controller;
   a second test packet generator unit with
      a microprocessor for generating Ethernet test packets,
      packet memory for storing Ethernet test packets, said microprocessor being connected to said packet memory,
      a media access controller connected to said packet memory and to said microprocessor, said media access controllers for controlling an output of Ethernet test packets from the packet memory, and
      a physical layer connection to said media access controller; and
   a packet generating link connecting said microprocessor of said first test packet generator unit with said microprocessor of said second test packet generator unit for communication between microprocessors and simultaneous Ethernet test packet generation and data checking using parallel microprocessors, parallel memory and parallel ports of physical layers.

2. The packet generating Ethernet testing system according to claim 1, each generating unit further comprising:
   a packet forwarding device connected to said packet memory and to said microprocessor;
   a MAC bus, said packet forwarding device being connected to said MAC bus for forwarding packets to said MAC bus and receiving packets from said MAC bus;

additional media access controller, said media access controller and said additional media access controller being connected to said MAC bus, said media access controllers for controlling an output of Ethernet packets from the packet memory;

a physical layer connection to said additional media access controller; and a media interface connected to each said physical layer, said media interface being connected to a port of a device to be tested for injecting Ethernet test packets into the device to be tested.

3. The packet generating Ethernet testing system according to claim 2, further comprising:

another MAC bus;

another plurality of media access controllers connected to said another MAC bus;

a physical layer connection to each of said another plurality of media access controllers;

a media interface connected to said physical layer of said another plurality of media access controllers;

a first additional packet forwarding device connected to said MAC bus;

a second additional packet forwarding device connected to said another MAC bus; and a main bus connected to said packet forwarding device, to said first additional packet forwarding device and to said second additional packet forwarding device, whereby said Ethernet packets from said high speed memory are forwarded to said main bus by said packet forwarding device and said first additional packet forwarding device and said second additional packet forwarding device selectively forward packets to said MAC bus and said another MAC bus respectively.

4. The packet generating Ethernet testing device according to claim 1, further comprising: queue structures defined by said memory, each queue structure being associated with one of said media access controllers, whereby said media access controllers successively point to memory locations in said memory.

5. The packet generating Ethernet testing device according to claim 4, further comprising: a direct memory access request engine associated with each media access controller for retrieving packets from the associated queue of said memory and transfers the packets to ports of said physical layer and associated said media interface.

6. The packet generating Ethernet testing device according to claim 5, further comprising a hub with a power supply for supporting said plurality of packet generating devices supplying power and having a backplane defining said packet generator link.

7. A packet generating Ethernet testing device, comprising:

a microprocessor for generating Ethernet packets configured for a particular port of a device to be tested;

packet memory for storing Ethernet packets, said microprocessor being connected to said packet memory;

a packet forwarding device connected to said packet memory and to said microprocessor;

a MAC bus, said packet forwarding device being connected to said MAC bus for forwarding packets to said MAC bus and receiving packets from said MAC bus;

a plurality of media access controllers connected to said MAC bus, said media access controllers for controlling an output of Ethernet packets from the packet memory;

a physical layer connection to each of said media access controllers; and a media interface connected to said physical layer, said media interface being connected to one port of the device to be tested via a particular media type to provide a physical connection and including a transceiver associated with said particular media type for injecting Ethernet packets into the port of the device to be tested whereby plural packets are generated for a plurality of ports allowing packets to be simultaneously sent to different ports of the device to be tested.

8. The packet generating Ethernet testing device according to claim 7, further comprising:

another MAC bus;

another plurality of media access controllers connected to said MAC bus;

a physical layer connection to each of said another plurality of media access controllers;

a media interface connected to said physical layer of said another plurality of media access controllers;

a first additional packet forwarding device connected to said MAC bus;

a second additional packet forwarding device connected to said another MAC bus; and a main bus connected to said packet forwarding device, to said first additional packet forwarding device and to said second additional packet forwarding device, whereby said Ethernet packets from said high speed memory are forwarded to said main bus by said packet forwarding device and said first additional packet forwarding device and said second additional packet forwarding device selectively forward packets to said MAC bus and said another MAC bus respectively.

9. A packet generating Ethernet testing device comprising:

a microprocessor for generating Ethernet packets;

packet memory for storing Ethernet packets, said microprocessor being connected to said packet memory;

a packet forwarding device connected to said packet memory and to said microprocessor;

a MAC bus, said packet forwarding device being connected to said MAC bus for forwarding packets to said MAC bus and receiving packets from said MAC bus;

a plurality of media access controllers connected to said MAC bus, said media access controllers for controlling an output of Ethernet packets from the packet memory;

a physical layer connection to each of said media access controllers;

a media interface connected to said physical layer, said media interface being connected to a port of a device to be tested for injecting Ethernet packets into the device to be tested; and queue structures defined by said memory, each queue structure being associated with one of said media access controllers, whereby said media access controllers successively point to memory locations in said memory.

10. The packet generating Ethernet testing device according to claim 9, further comprising: a direct memory access request engine associated with each media access controller for retrieving packets from the associated queue of said memory and transfers the packets to ports of said physical layer and associated said media interface.

11. A packet generating Ethernet testing device, comprising:

a microprocessor for generating Ethernet packets;

packet memory for storing Ethernet packets said microprocessor being connected to said packet memory;

a packet forwarding device connected to said packet memory and to said microprocessor;

a MAC bus, said packet forwarding device being connected to said MAC bus for forwarding packets to said MAC bus and receiving packets from said MAC bus;

a plurality of media access controllers connected to said MAC bus, said media access controllers for controlling an output of Ethernet packets from the packet memory;

a physical layer connection to each of said media access controllers;

a media interface connected to said physical layer, said media interface being connected to a port of a device to be tested for injecting Ethernet packets into the device to be tested; and a link to other packet generating devices for coordinating a plurality of packet generating devices.

12. The packet generating Ethernet testing device according to claim 11, further comprising a hub with a power supply for supporting said plurality of packet generating devices and supplying power.

13. A process for generating Ethernet testing packets, comprising the steps of:

providing a first test packet generator unit with
a microprocessor for generating Ethernet test packets,
packet memory for storing Ethernet test packets, said microprocessor being connected to said packet memory,
a media access controller connected to packet memory and to said microprocessor, said media access controller for controlling an output of Ethernet packets from the packet memory, and
a physical layer connection to said media access controller;

providing a second test packet generator unit with
a microprocessor for generating Ethernet test packets,
packet memory for storing Ethernet test packets, said microprocessor being connected to said packet memory,
a media access controller connected to packet memory and to said microprocessor, said media access controller for controlling an output of Ethernet packets from the packet memory, and
a physical layer connection to said media access controller;

linking said microprocessor of said first test packet generator unit with said microprocessor of said second test packet generator unit; and providing communication between microprocessors for coordinated Ethernet test packet generation and data checking using parallel microprocessors, parallel memory and parallel ports of physical layers.

14. The process according to claim 13, further comprising the steps of:

providing each generator unit with
a packet forwarding device connected to said packet memory and to said microprocessor;
a MAC bus, said packet forwarding device being connected to said MAC bus for forwarding packets to said MAC bus and receiving packets from said MAC bus;
an additional media access controller, said media access controller and said additional media access controller being connected to said MAC bus, said media access controllers for controlling an output of Ethernet packets from the packet memory;
a physical layer connection to said additional media access controller; and
a media interface connected to each said physical layer, said media interface being connected to a port of a device to be tested for injecting Ethernet test packets into the device to be tested; and providing packet generation at each unit for a plurality of ports for a large port count test using simultaneous packet generation, transmission, reception and data integrity checking at each unit.

15. The process according to claim 14, further comprising:

providing each unit with
another MAC bus;
another plurality of media access controllers connected to said MAC bus;
a physical layer connection to each of said another plurality of media access controllers;
a media interface connected to said physical layer of said another plurality of media access controllers;
a first additional packet forwarding device connected to said MAC bus;
a second additional packet forwarding device connected to said another MAC bus; and
a main bus connected to said packet forwarding device, to said first additional packet forwarding device and to said second additional packet forwarding device; and forwarding said Ethernet packets from said high speed memory to said main bus by said packet forwarding device and said first additional packet forwarding device and said second additional packet forwarding device selectively forward packets to said MAC bus and said another MAC bus respectively.

16. The process according to claim 14, further comprising:

providing a queue structures defined by said memory;
associating each queue structure with one of said media access controllers, whereby said media access controllers successively point to memory locations in said memory.

17. The process according to claim 16, further comprising:

providing a direct memory access request engine associated with each media access controller for retrieving packets from the associated queue of said memory and transfers the packets to ports of said physical layer and associated said media interface.

18. The process according to claim 17, further comprising:

providing a hub with a power supply for supporting said plurality of packet generating units;
supplying power to said units;
using a backplane of said hub as said packet generator link.

* * * * *